United States Patent
Van Herpen et al.

(10) Patent No.: US 9,641,725 B2
(45) Date of Patent: May 2, 2017

(54) USE OF AMBIENCE LIGHT FOR COPY PROTECTION OF VIDEO CONTENT DISPLAYED ON A SCREEN

(71) Applicant: PHILIPS LIGHTING HOLDING B.V., Eindhoven (NL)

(72) Inventors: Maarten Marinus Johannes Wilhelmus Van Herpen, Eindhoven (NO); Arnoldus Johannes Lucas Maria Maandonks, Eindhoven (NL); Oscar Hendrikus Willemsen, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/646,455

(22) PCT Filed: Nov. 15, 2013

(86) PCT No.: PCT/IB2013/060158
§ 371 (c)(1),
(2) Date: May 21, 2015

(87) PCT Pub. No.: WO2014/083473
PCT Pub. Date: Jun. 5, 2014

(65) Prior Publication Data
US 2015/0304522 A1    Oct. 22, 2015

Related U.S. Application Data

(60) Provisional application No. 61/730,119, filed on Nov. 27, 2012.

(51) Int. Cl.
*G06F 21/00* (2013.01)
*H04N 1/44* (2006.01)
(Continued)

(52) U.S. Cl.
CPC ......... *H04N 1/4493* (2013.01); *G06T 1/0021* (2013.01); *H04N 1/4486* (2013.01);
(Continued)

(58) Field of Classification Search
CPC ..................... H04N 21/2585; H04N 21/4627
See application file for complete search history.

(56) References Cited

U.S. PATENT DOCUMENTS 5,243,411 A * 9/1993 Shirochi .............. H04N 7/1696
348/460
7,324,646 B1    1/2008 Burstyn
(Continued)

FOREIGN PATENT DOCUMENTS

CN          101689015 A      3/2010
EP          1237369 A2       9/2002
(Continued)

OTHER PUBLICATIONS

"An Early History of Digital Cinema Technology", 2012 MKPE Consulting LLC.
(Continued)

*Primary Examiner* — Morshed Mehedi (57) ABSTRACT

The invention provides a method for impeding making a useful copy with an optical recording device of video content displayed on a screen, wherein the method comprises displaying the video content on the screen, illuminating with ambience light of an ambience light source the screen, the ambience light comprises light having a wavelength in the visible part of the spectrum, wherein the ambience light is controlled as function of the video content, and wherein the ambience light is intensity modulated with an intensity modulation having an intensity modulation frequency selected from the range of 40 Hz to 00 Hz.

8 Claims, 5 Drawing Sheets

(51) Int. Cl.
 *H04N 5/913* (2006.01)
 *H04N 9/73* (2006.01)
 *H04N 21/431* (2011.01)
 *H04N 21/4627* (2011.01)
 *H04N 9/31* (2006.01)
 *H05B 37/02* (2006.01)
 *G06T 1/00* (2006.01)

(52) U.S. Cl.
 CPC ......... *H04N 5/913* (2013.01); *H04N 9/3182* (2013.01); *H04N 9/73* (2013.01); *H04N 21/4312* (2013.01); *H04N 21/4627* (2013.01); *H05B 37/029* (2013.01); *H04N 2005/91392* (2013.01); *H04N 2201/3281* (2013.01)

(56) References Cited

U.S. PATENT DOCUMENTS

| | | | |
|---|---|---|---|
| 2003/0053003 A1* | 3/2003 | Nishi | H04N 5/913 348/744 |
| 2003/0063361 A1 | 4/2003 | Ohnishi | |
| 2004/0109562 A1* | 6/2004 | Ohnishi | G03B 21/14 380/200 |
| 2006/0262280 A1* | 11/2006 | Duffield | G03B 21/14 353/46 |
| 2011/0064218 A1* | 3/2011 | Willis | H04N 5/913 380/210 |
| 2011/0206349 A1* | 8/2011 | Schultz | H04N 5/913 386/252 |

FOREIGN PATENT DOCUMENTS

| | | |
|---|---|---|
| WO | 200074366 A2 | 12/2000 |
| WO | 2005020571 A1 | 3/2005 |
| WO | 2006003600 A1 | 1/2006 |
| WO | 2006003624 A1 | 1/2006 |
| WO | 2009061302 A1 | 5/2009 |
| WO | 2011073877 A1 | 6/2011 |

OTHER PUBLICATIONS

Steven Keeping, "Characterizing and Minimizing LED Flicker in Lighting Applications", http://www.digikey.com/en/articles/techzone/2012/jul/characterizing-and-minimizing-led-flicker-in-lighting-applications.

* cited by examiner

FIG. 3

USE OF AMBIENCE LIGHT FOR COPY PROTECTION OF VIDEO CONTENT DISPLAYED ON A SCREEN

CROSS-REFERENCE TO PRIOR APPLICATIONS

This application is the U.S. National Phase application under 35 U.S.C. §371 of International Application No. PCT/IB2013/060158, filed on Nov. 15, 2013, which claims the benefit of U.S. Provisional Patent Application No. 61/730,119, filed on Nov. 27, 2012. These applications are hereby incorporated by reference herein.

FIELD OF THE INVENTION

The invention relates to a method for impeding making a useful copy with an optical recording device of video content displayed on a screen. The invention also relates to a LED-based ambience light source and to a cinema system that may be used in such method.

BACKGROUND OF THE INVENTION

The problem of video copying cinema movies is known in the art. Several methods to prevent illegal copying have been suggested in the art. US-2003/063361, for instance, describes an optical state modulation method. The method comprises the steps of periodically modulating luminance of a visible light in temporal domain so as to generate an optical state variation on a recorded image that is obtained by image-capturing of a displayed image, the visible light being superposed on an original display image to produce the displayed image, the optical state variation being independent of an original display image and generating no hampering effect when the displayed image is directly watched.

SUMMARY OF THE INVENTION

Content protection is an important topic for digital cinema. Many security measures are taken to prevent pirates from copying the digital content. Presently, often encrypted content is delivered to cinemas on a hard drive. A separate key is supplied to the cinema, which is used to decrypt the content on a digital cinema server. Next, the digital cinema server may decompress the video content (for example it may be compressed with MPEG2 or JPEG2000). However, before sending the decompressed content to the projector it may be encrypted again for a so-called 'link encryption', which protects the communication between the digital cinema server and the projector (for example with High-bandwidth Digital Content Protection). As an additional layer of protection also watermarks can be added to the content, in order to identify the source of the content in the case of piracy.

The major motion picture studios are losing large amounts of money due to piracy. The worldwide motion picture industry, distributors, theaters, video stores and pay-per-view operators, lose each year billions of dollars as a result of piracy.

The problem with current security measures in digital cinema is that they do not prevent pirates from filming the content from the cinema screen. Watermarks can help to identify the source of pirate content, but it does not prevent the actual copying and spreading of the content. Further, often (such) solutions to impede piracy can easily be circumvented or filtered out.

Hence, it is an aspect of the invention to provide an alternative method to make piracy more difficult or even substantially prevent, which method preferably further at least partly obviate one or more of above-described drawbacks. It is further an aspect of the invention to provide a light source that can be used in a display space, wherein e.g. a movie is shown on a screen, for performing (or assisting) such method. It is also an aspect of the invention to provide a cinema system that can be used for such (piracy impeding) method. It is yet a further aspect to provide a more immersive experience when watching video content on a display device in combination with anti-piracy measures.

The solution proposed here is to shine visible light from an (additional) light source with a pre-determined modulation frequency at the cinema screen while the movie plays. When the frequency is chosen well, a camera will not be able to properly film the content, because the light source runs out of sync with the camera resulting in stripes running through the movie content. Normally, the visible light source would be distracting from the movie content, but in this invention the color and/or intensity of the light of the light source, especially at least the intensity, and even more especially both the color and intensity, are coupled to the movie content. For example, when the screen is dark(er), also the light source(s) may be dark(er), or when the screen is blue, also the light of the light source(s) may be blue.

Hence, in a first aspect, the invention provides a method for impeding making a useful copy with an optical recording device of video content displayed on a screen, wherein the method comprises displaying the video content on the screen, illuminating with ambience light of an ambience light source the screen, wherein the ambience light comprises light having a wavelength in the visible part of the spectrum, wherein the ambience light is controlled as function of the video content, and wherein the ambience light is intensity modulated with an intensity modulation having an intensity modulation frequency ("modulation frequency") selected from the range of 40 Hz to 500 Hz, especially 50 Hz to 500 Hz, even more especially 50 Hz to 250 Hz.

Advantageously, this may provide the beneficial effect of a more immersive video experience (ambience lighting), such as a cinema experience, with ambience lighting around the screen and/or elsewhere in a display space, while at the same time providing additional security. Furthermore, in the invention the optical state variation, i.e. the variation in intensity, can be stronger, because may it be linked to movie content and is part of the experience.

The term "optical recording device" may relate to any device that is able to record optical data from a screen, especially a wireless optical recording device. Examples thereof are a camcorder, a cell phone, or another (mobile) device with a camera, especially a CCD camera, like a laptop, a tablet, etc. Such optical recording device may be used in a display space to record unauthorized the data from the screen and optionally also other data, like also the audience (or crowd) in such display space.

During display of the video content (on a (remote) screen), the technology of the invention may be applied. As the ambience light (see also below) modulates the image on the screen with a modulation frequency, especially one that differs from the frame frequency of the video content (see also below), such optical recording device cannot (easily) copy the video content, as this content is disturbed by the ambience light. The human eye cannot see this modulation;

however, the optical recording device does. This leads to disturbed pictures. In this way, it is impeded (i.e. made more difficult or even prevented) that a useful copy of the video content (from the screen) can be made with the optical recording device. Additional modulations of the ambience light may even make illegal copying more difficult (see below).

Herein, the term "display space" may e.g. refer to a cinema, a music hall, a theater, an opera house, a stadium, an arena, a conference room, a home, a hospitality area (such as a restaurant, like a restaurant lobby, a pub, etc.) a church, an exhibition ground, and an open square.

In an embodiment, the screen comprises one or more of a display screen and a projection screen. The display screen may especially be a TV, like a LED TV or a plasma TV; the projection screen (in general a remote screen) may especially be a (white) area, on which a movie can be projected (with a projector (remote from the screen)), such as a cinema screen. The screen can be a rigid wall-mounted screen, a pull-down screen, an electric screen (with an electric motor to position the screen to a use and non-use position), a switchable projection screen (can be opaque and clear), or (even) a mobile screen. The term "screen" may also relate to a plurality of screens. Hence, the term screen may also relate to an aggregate screen, i.e. an arrangement of screens, that are used as one screen, for instance to display the image(s) or to project the image(s) on with the projector. Especially, the term screen herein relates to a screen on which the video content is projected with a projection device, i.e. a remote screen. The term "projector" may also relate to a plurality of projectors. The term "additional ambience light source" (see also below) may also relate to a plurality of ambience light sources. This term may especially relate to an ambience lighting system comprising a plurality of ambience light sources (that may be arranged at a plurality of locations in the display space).

The term "video content" refers to an image, especially to a plurality of images which are to be displayed sequentially (consecutively) on the screen. Hence, the term video content may refer to the content of a movie ("motion pictures") that is to be displayed on a (remote) screen. In this way, moving images can be projected on the (remote) screen.

Ambilight, which is short for Ambient Lighting Technology, is a feature invented by Philips, generating lighting effects around the TV that correspond to the video content. Ambilight may have the advantages of a larger virtual screen, a more immersive viewing experience, and it may reduce viewer eye strain.

The concepts as well as various methods of calculating the color from the video signal are described in for instance US-2006/062424, WO-2006/003600, and WO-2006/003624, which are herein incorporated by reference.

The creation of ambience light in for instance cinemas is known in the art. WO-2011/073877, which is incorporated herein by reference, for instance describes a method for providing an ambience lighting effect in a cinema comprising a cinema display screen arranged on a front wall of the cinema and a plurality of light sources, comprising receiving first and second image content to be sequentially displayed on the cinema display screen, determining at least one of a color and intensity for the second image content, determining a second set of control data for controlling the plurality of light sources to emit an ambient lighting effect based on at least one of the color and intensity for the second image content, and associating the second set of control data with the first set of image content. Advantages of the method of WO-2011/073877 include the possibility to provide an improved ambient lighting experience by using the "extra space" specifically available in a cinema, e.g. walls, floor and ceiling. Note that in WO-2011/073877, ambience lighting is generated by light sources that are not necessarily behind or directly adjacent to the screen (on a front wall), but may be arranged remote, such on side walls, or comprised by the ceiling or the floor.

Herein, the concept of Ambient light or Ambilight is further indicated as ambience light or ambience lighting. Note that ambience light may be based on the content of a video image displayed on the screen, but may also be based on the video content of a plurality of video images, of which one or more may be preceding a current video image and/or one or more may be subsequent to a current video image. Especially the color, and optionally also the intensity, of the ambience light is related to a dominant color of at least part of the image (or plurality of images).

As e.g. indicated in e.g. WO-2006/003624 and WO-2006/003600, a method may be applied for dominant color extraction from video content (i.e. one (or more consecutive) image(s)) encoded in a rendered color space to produce, using perceptual rules, a dominant color for emulation by the ambient light source.

Especially, this may include a method for dominant color extraction from video content encoded in a rendered color space (e.g. YUV, YCrCb, RGB) to produce, using perceptual rules, a dominant color for emulation by an ambient light source, comprising: (1) Performing dominant color extraction from pixel chromaticities from said video content in said rendered color space to produce a dominant color by extracting any of: (a) a mode of said pixel chromaticities; (b) a median of said pixel chromaticities; (c) a weighted average by chromaticity of said pixel chromaticities; (d) a weighted average of said pixel chromaticities using a pixel weighting function that is a function of any of pixel position (i, j), chromaticity (x,y,R), and luminance; (2) further deriving the chromaticity of said dominant color in accordance with a perceptual rule, said perceptual rule chosen from any of: (a) a simple chromaticity transform; (b) a weighted average using said pixel weighting function so further formulated as to exhibit an influence from scene content that is obtained by assessing any of chromaticity and luminance for a plurality of pixels in said video content; (c) an extended dominant color extraction using a weighted average where said pixel weighting function is formulated as a function of scene content that is obtained by assessing any of chromaticity and luminance for a plurality of pixels in said video content, with said pixel weighting function further formulated such that weighting is at least reduced for majority pixels; and (3) transforming said dominant color from said rendered color space to a second rendered color space (R'G'B') so formed as to allow driving said ambient light source.

In yet another embodiment, this may involve a method for dominant color extraction from video content encoded in a rendered color space (RGB) to produce, using perceptual rules in accordance with a user preference, a dominant color for emulation by an ambient light source, comprising: (1) performing dominant color extraction from pixel chromaticities from said video content in said rendered color space to produce a dominant color by extracting any of: (a) a mode of said pixel chromaticities; (b) a median of said pixel chromaticities; (c) a weighted average by chromaticity of said pixel chromaticities; (d) a weighted average of said pixel chromaticities using a pixel weighting function that is a function of any of pixel position ((iota), j), chromaticity (x, y, R), and luminance; (2) further deriving at least one of the luminance, the chromaticity, a temporal delivery, and a spatial extraction of said dominant color in accordance with respective perceptual rules to produce a preferred ambient broadcast, and where said respective perceptual rules are varied in character an d effect by at least one of a plurality of possible explicit indicated user preferences; and where said respective perceptual rules comprise at least one of: (I) a luminance perceptual rule chosen from any of: (a) a luminance increase; (b) a luminance decrease; (c) a luminance floor; and (4) a luminance ceiling; (5) a suppressive luminance threshold; (6) a luminance transform; (II) a chromaticity perceptual rule chosen from at least one of: (a) a simple chromaticity transform; (b) a weighted average using said pixel weighting function so further formulated as to exhibit an influence from scene content that is obtained by assessing any of chromaticity and luminance for a plurality of pixels in said video content; (c) an extended dominant color extraction using a weighted average where said pixel weighting function is formulated as a function of scene content that is obtained by assessing any of chromaticity and luminance for a plurality of pixels in said video content, with said pixel weighting function further formulated such that weighting is at least reduced for majority pixels; (III) a temporal delivery perceptual rule chosen from at least one of: (a) a decrease in the rate of change in at least one of luminance and chromaticity of said dominant color; (b) an increase in the rate of change in at least one of luminance and chromaticity of said dominant color; (IV) a spatial extraction perceptual rule chosen from at least one of: (a) giving greater weight in said pixel weighting function to scene content containing newly appearing features; (b) giving lesser weight in said pixel weighting function to scene content containing newly appearing features; (c) giving greater weight in said pixel weighting function to scene content from a selected extraction region; and (d) giving lesser weight in said pixel weighting function to scene content from a selected extraction region; and (3) Transforming the luminance and chromaticity of said preferred ambient broadcast from said rendered color space to a second rendered color space (R'G'B') so formed as to allow driving said ambient light source.

The term "rendered color space" may especially denote an image or color space captured from a sensor, or specific to a source or display device, which is device and image specific. RGB color spaces may be rendered image spaces, including the video spaces used to drive video display. Herein, both the color spaces specific to the video display and the ambient light source may be rendered color spaces. Most LED light sources will use RGB color space, because a LED luminaire typically comprises a red, green and blue LED. The term "scene brightness" especially refers to any measure of luminance in scene content according to any desire criterion. The term "scene content" or "image content" may especially refer to that characteristic of video information capable of forming a viewable image that can be used to influence a desired choice of dominant color. Examples include white clouds, or darkness throughout much of a video image, which might cause certain pixels making such an image to be deemed majority pixels, or might result in non-isotropic treatment of pixels in a pixel weighting function; or might cause an image feature to be detected and subject to special or extended dominant color extraction. The term "simple chromaticity transform" may especially refer to a change or derivation of a dominant color or chromaticity according to a perceptual rule, not chosen or derived as a function of scene content, and where the change or derivation results in a chromaticity which is different from that which might otherwise be chosen. An example: a transform of a first dominant color (x, y) chosen via dominant color extraction (e.g., purple) to a second color (x', y') in order to satisfy a perceptual rule. Further, the phrase "transforming color information to an unrendered color space" herein may especially comprise either direct transformation to the unrendered color space, or use or benefit derived from using inversion of a tristimulus primary matrix obtained by transforming to the unrendered color space, or any calculational equivalent. The term "unrendered color space" may especially denote a standard or non-device-specific color space, such as those describing original image colorimetry using standard CIE XYZ; ISO RGB, such as defined in ISO 17321 standards; Photo YCC; and the CIE LAB color space.

Ambience light may differ in intensity and/or color for instance as function from the distance to the screen. By way of example, when dividing a (projected) video image in a number of parts (or sub sections), the dominant color from each part may be extracted and be used as color for ambience light that is provided adjacent to the (projected) video image and adjacent to the respective (projected) video image part. The term "adjacent" may be understood in one embodiment as practically no distance between the (projected) video image part and the ambience light adjacent to the (projected) video image part. However, the ambience light may also be provided more remote from the (projected) video image, such as for instance may be the case in WO-2011/073877.

As indicated above, the ambience light is dependent upon the video content. More especially, the ambience light is controlled as function of the video content. It is indicated above, how the ambience light, especially its color and/or intensity, even more especially both the color and intensity, can be controlled as function of the video content. Advantageously, the color of the ambience light follows the color of the image(s) and the lighting level also follows the lighting level of the image(s). Hence, when a scene displayed is dark, the ambience light level (at least at the screen) may also be diminished, and when the scene displayed is bright, also the ambience light level may be high.

As indicated above, the ambience light may be based on the video content of one image. However, the ambience light may also be controlled as function of the video content of a plurality of images, including one or more preceding and/or including one or more subsequent images (than the image displayed at a certain time). Therefore, in an embodiment the video content comprises a plurality of images to be displayed sequentially, wherein the ambience light comprises one or more colors determined on one or more average colors of one or more sub-sections of a plurality of subsequent images. Especially, the ambience light comprises one or more colors determined on one or more average colors of one or more sub-sections of an image or the ambience light comprises one or more colors determined on one or more average colors of one or more sub-sections of a plurality of subsequent images. Hence, the ambience light is controlled as function of the video content, In the method of the invention, an ambience light source is applied. Such ambience light source is e.g. described in WO-2011/073877, which is incorporated herein by reference. Ambience light sources may e.g. be wall washers, and/or may be integrated in walls and/or in wall coverings, and/or in ceiling coverings, and/or in floor coverings. The term "ambience light source" may also relate to a plurality of ambience light sources. This term may especially relate to an ambience lighting system comprising a plurality of ambience light sources (that may be arranged at a plurality of locations in the display space).

In a specific embodiment, a plurality of ambience light sources is applied to illuminate the screen, wherein the ambience light sources address different parts of the screen. In such embodiment, the color of the ambience light surrounding the screen may even be better controlled as function of the video content. In addition, optionally the modulation for one or more of such ambience light sources may differ from each other, thereby even more impeding illegal copying of the video content on the screen.

As indicated above, the method includes illuminating with ambience light of an ambience light source the screen. Hence, one or more ambience light sources may be configured to illuminate the screen. This may include that the ambience light source substantially only illuminates the screen with the ambience light. However, it may also be that the ambience light source also illuminates non-screen parts. As ambience light may be desired, and not only protection, in a specific embodiment, the ambience light source is configured to illuminate the screen and also non-screen parts, like a wall, a floor, a ceiling, or audience. The phrase "illuminating the screen" and similar phrases also include embodiments wherein only part of the screen is illuminated. Hence, in an embodiment the ambience light source is configured relative to a screen to allow only part of the visible ambience light impinge on the screen.

In a specific embodiment, the ambience light source is configured relative to a screen to allow (visible) ambience light of the ambience light source impinge on the screen (only) in an indirect way. Hence, the (method of the) invention may also include illuminating the screen with the ambience light (only) in an indirect way. Herein, the term "indirect way" especially refers to embodiments wherein the ambience light source is configured to illuminate a non-screen part, such as a one or more of a wall, a room divider, a ceiling, a floor, an audience in a display space, etc., especially one or more of a wall, a room divider, and a ceiling, wherein only via reflection via the illuminated wall, ceiling, floor, audience in a display space, etc., the ambience light may reach the screen.

When there are more than one ambience light sources, one or more may be configured to illuminate the screen, and one or more others may be configured to illuminate other part(s) of the display space.

The ambience light herein comprises light having a wavelength in the visible part of the spectrum. The terms "visible" light or "visible emission" refer to light having a wavelength in the range of about 380 nm to 750 nm. The fact that the ambience light comprises light having a wavelength in the visible part of the spectrum does not exclude the ambience light also comprising light have a wavelength in e.g. the IR (infra red). However, the security is not (solely) based on IR light, that might easily be filtered out by a filter, on e.g. the optical recording device. Especially at least 50%, even more especially at least 80%, yet even more especially at least 90% of the light intensity (in Watt) of the ambience light source is in the visible part of the spectrum. In yet a further embodiment, in the range of 5% to 40% of the light intensity (in Watt) of the ambience light source is in the infra red (especially in the range of 750 nm to 3000 nm, even more especially substantially in the range of 750 nm to 1200 nm).

The term white light herein, is known to the person skilled in the art. It especially relates to light having a correlated color temperature (CCT) between about 2000 K and 20000 K, especially between about 2700 K and 20000 K, for general lighting especially in the range of about 2700 K to 6500 K, and for backlighting purposes especially in the range of about 7000 K to 20000 K, and especially within about 15 SDCM (standard deviation of color matching) from the BBL (black body locus), especially within about 10 SDCM from the BBL, even more especially within about 5 SDCM from the BBL.

The terms "violet light" or "violet emission" especially relates to light having a wavelength in the range of about 380 nm to 440 nm. The terms "blue light" or "blue emission" especially relate to light having a wavelength in the range of about 440 nm to 490 nm (including some violet and cyan hues). The terms "green light" or "green emission" especially relate to light having a wavelength in the range of about 490 nm to 560 nm. The terms "yellow light" or "yellow emission" especially relate to light having a wavelength in the range of about 560 nm to 590 nm. The terms "orange light" or "orange emission" especially relate to light having a wavelength in the range of about 590 nm to 620 nm. The terms "red light" or "red emission" especially relate to light having a wavelength in the range of about 620 nm to 750 nm.

The intensity is modulated with an intensity modulation frequency, especially in the range of 40 Hz to 500 Hz. Below 50 Hz, and especially below 40 Hz, the modulation may become visible to the human eye, which is undesired. Above 250 Hz, and especially above 500 Hz, the modulation effect may, especially in view of the frame rate (see below) of the video content, not provide enough the desired effect. Hence, especially the ambience light is intensity modulated with an intensity modulation having an intensity modulation frequency selected from the range of 50 Hz to 250 Hz.

The video content may be provided on the screen with a frame rate. Frame rate (also known as frame frequency) is the frequency (rate) at which an imaging or projection device produces unique consecutive images, called frames. The term applies equally well to film and video cameras, computer graphics, projectors, and motion capture systems. Frame rate can be expressed in frames per second (FPS) and or in hertz (Hz). Herein, the frame rate is indicated in hertz. Both the display device, as well as the optical recording device have a frame rate.

In a specific embodiment, the video content is displayed on the screen with a frame rate, and the frame rate and the (intensity) modulation frequency have a frequency difference in the range of 0.5 Hz to 50 Hz, preferably in the range of 1 Hz to 10 Hz. This means that when a copy is made with a camera that is matched to the video content frame rate, the ambience light will be visible with a frequency in the range of 0.5 Hz to 50 Hz, preferably in the range of 1 Hz to 10 Hz.

In other words, the cinema system that may be used, or the ambience light source that is used, is (are) configured to provide the video content and the ambience light with a frequency difference between the frame rate and the modulation frequency in the range of 0.5 Hz to 50 Hz. Especially in such embodiments, when optically recording the (consecutive) image(s) on the screen, bands may be seen which impede making a useful copy. As indicated below, in a specific embodiment the cinema system that may be used, or the ambience light source that is used, is (are) further configured to vary the frequency difference as function of time. Hence, in an embodiment the frame rate of the video content and the modulation frequency differ at least part of the time the video content is displayed. Hence, in an embodiment, the ambience light is modulated with an intensity modulation have a intensity moduluation frequency as indicated above, but with a varying intensity modulation frequency (varying in time).

Specific frame rates in the art are e.g. 24 Hz, 25 Hz, and 60 Hz, though other frame rates are also known (like 30 Hz, 48 Hz, 50 Hz, 72 Hz, 120 Hz, and 300 Hz). Hence, especially the ambience light is intensity modulated with an intensity modulation having an intensity modulation frequency of at least 40 Hz, especially at least 50 Hz, and being selected from the group consisting of 24x Hz, 25x Hz, 30x Hz, 48x Hz, 50x Hz, 60x Hz, 72x Hz, 120x Hz, and 300x Hz, wherein x is a non-integer number larger than zero. In other words, the intensity modulation frequency is not a multiple of a frequency chosen from the group consisting of 24 Hz, 25 Hz, 30 Hz, 48 Hz, 50 Hz, 60 Hz, 72 Hz, 120 Hz, and 300 Hz. The value of x will be at least such that the intensity modulation frequency is at least 40 Hz, especially at least 50 Hz, and in general x will be such that the intensity modulation frequency is not larger than 500 Hz, especially not larger than 250 Hz.

As indicated above, a method may also be applied wherein x varies in time (i.e. during the display time the video content is displayed). When x varies in time, during at least part of the time x complies with above indicated conditions (such as at least 40 Hz and preferably not larger than 500 Hz, and x being a non-integer number larger than 0), but part of the time x may also not comply. For instance, the variation in the modulation frequency of the ambience light might follow a sine curve.

As indicated above, the ambience light is controlled as function of the video content. This may especially indicate that the color and/or the intensity of the ambience light is controlled as function of the video content. In a specific embodiment, the intensity of the ambience light is controlled as function of the video content. Yet in a further embodiment, both the color and the intensity of the ambience light is controlled as function of the video content. Note that the control of the ambience light may refer to a plurality of illuminated parts (or sub sections) at the screen and optionally next to the screen, wherein (each) the color and/or intensity of the ambience light of each part may be related to a respective sub section of the image (or respective sub sections of the image of a plurality of images).

The intensity modulation may further be modulated with respect to intensity (amplitude), frequency and duty cycle. For instance, the intensity modulation of the ambience light may be an intensity modulation between a minimum amplitude and a maximum amplitude, wherein the ratio between the minimum amplitude and maximum amplitude is in the range of 2:100 and 25:100, especially in the range of 5:100 and 20:100, even more especially in the range of 5:100 and 15:100. Hence, in an embodiment, the intensity modulation has maximum amplitude, wherein the maximum amplitude is varied in time. Note that the ambience light may be a function of the video content in the sense that when the image(s) are bright, the ambience light may be strong, and vice versa. However, next to this following of the video content, there may thus be a further modulation with respect to amplitude (and/or frequency and/or duty cycle, etc.) as defined herein.

Alternatively or additionally, the intensity modulation frequency is varied in time. Again, alternatively or additionally, the intensity modulation has a duty cycle, and the duty cycle may especially be in the range of 10% to 90%, such as 20% to 80%, like e.g. 10% to 30% or 70% to 90%. Alternatively or additionally, the intensity modulation has a duty cycle, wherein the duty cycle may be varied in time. This may further impede making a useful copy of the video content on the screen.

The method may further comprise providing with the ambience light a watermark on the screen. How to make a watermark on the screen is e.g. described in US-2006/0262280, which is incorporated herein by reference.

As ambience light source(s) a LED based light source may be applied. LEDs are in general pulse-width modulated (PWM). This modulation may especially be in the kHz or even MHz regime. Hence, this pulse-width modulation of the LED-based light source may be further modulated to obtain the intensity modulation frequency as define herein. Hence, in such embodiment the LED-based light source may be modulated with two modulation frequencies, the pulse width modulation and the intensity modulation as described herein.

Therefore, in an embodiment, the ambience light source comprises a LED based light source. Therefore, in a further aspect the invention provides a LED-based ambience light source, configured to provide ambience light that is variable in intensity, the ambience light comprises light having a wavelength in the visible part of the spectrum, wherein the LED-based ambience light source further comprises a modulator, configured to modulate the intensity of the ambience light with an intensity modulation having an intensity modulation frequency especially selected from the range of 40 Hz to 500 Hz, especially 50 Hz to 500 Hz, even more especially 50 Hz to 250 Hz.

In yet a further embodiment, the invention provides a cinema system comprising a controller configured (i) to control a display device configured to display video content on a screen, and configured (ii) to control an ambience light source configured to provide ambience light that is variable in intensity (with the ambience light of the ambience light source comprising light having a wavelength in the visible part of the spectrum), wherein the controller is further configured to control the ambience light as function of the video content and configured to modulate the intensity of the ambience light with an intensity modulation having an intensity modulation frequency selected from the range of 40 Hz to 500 Hz, especially 50 Hz to 500 Hz, even more especially 50 Hz to 250 Hz. Especially, such ambience light source is configured to illuminate with ambience light the screen.

Of course, this cinema system may further include one or more of the display device and the ambience light source. Hence, in a further embodiment the cinema system further comprises the display device and the ambience light source, the ambience light of the ambience light source comprising light having a wavelength in the visible part of the spectrum, wherein the display device is configured to display the video content on the screen with a frame rate, and wherein cinema system is in a specific embodiment configured to provide the video content and the ambience light with a frequency difference between the frame rate and the modulation frequency in the range of 0.5 Hz to 50 Hz. As indicated above, the ambience light source may especially comprise a LED based light source. Further, the cinema system may further comprise a projector, configured to project video content on a remote screen. Especially, such ambience light source is configured to illuminate with ambience light the screen.

In yet a further embodiment, also one or more additional ambience light sources may be applied, which are not (substantially) configured to illuminate the screen with ambience light (directly or indirectly). The cinema system may be configured to control these one or more additional ambience light sources. Also the ambience light of these light sources will depend upon the video content. Hence, the ambience light (off-screen) may be controlled as function of the color and optionally intensity of the video content, and also as function of the distance to the screen or screen part.

In yet a further aspect, the invention also provides a display device, such as a projector, comprising a controller and a sensor, wherein the sensor is configured to optically sense the screen and provide a sensor signal, and wherein the controller is configured to derive from the sensor signal information whether or not the screen is illuminated with ambience light, and wherein the controller is further configured to interrupt displaying video content (on the screen) when no ambience light is sensed. The sensor could for example be a camera, and the controller rune a computer program that analyses the video that is recorded with the camera. In another example, the camera is a light sensor, and the controller detects the modulation frequency of the ambience light in the signal of the light sensor.

In yet a further aspect, the invention also provides a display space, comprising the cinema system as described herein and the screen (as described herein), and especially including the display device and the ambience light source.

The term "substantially" herein, such as in "substantially all emission" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices or apparatus herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to an apparatus or device comprising one or more of the characterizing features described in the description and/or shown in the attached drawings. The invention further pertains to a method or process comprising one or more of the characterising features described in the description and/or shown in the attached drawings.

The various aspects discussed in this patent can be combined in order to provide additional advantages. Furthermore, some of the features can form the basis for one or more divisional applications.

BRIEF DESCRIPTION OF THE DRAWINGS

Embodiments of the invention will now be described, by way of example only, with reference to the accompanying schematic drawings in which corresponding reference symbols indicate corresponding parts, and in which.

The drawings are not necessarily on scale.

DETAILED DESCRIPTION OF THE EMBODIMENTS

Figure 1A:
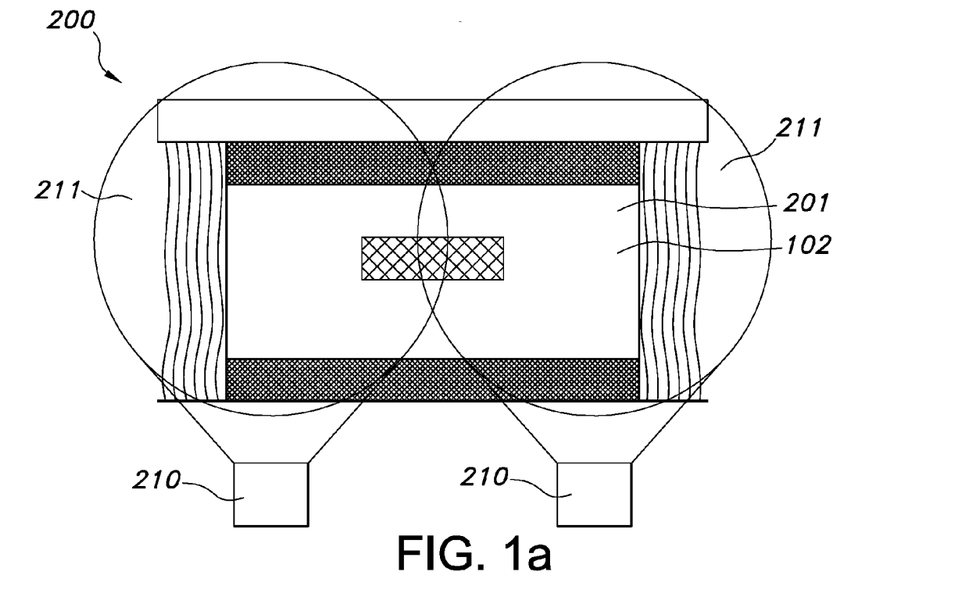
FIGS. 1a to 1d schematically depict some embodiments and/or aspects of the invention.

FIG. 1a schematically depicts an image 102 on a screen 201 in a display space 200. This screen 201 is in this embodiment a remote screen, see below, such as in a cinema. The projector, the projects the image 102 on the screen is not depicted (see however FIGS. 1b-1c). Further, ambience light sources 210 are depicted, which generate ambience light 211. At least part of the screen 201 (or image 102) is illuminated with the ambience light 211. Note that in this schematically depicted embodiment the ambience light extends beyond the screen. This may improve the experience of the video content, such as a more immersive experience. Hence, in this embodiment, the ambience light source 210 in fact comprise a plurality of ambience light sources 210.

The ambience lighting (content) may vary from image (frame) to image (frame). The ambience lighting (content) is controlled as function of the video content. The ambience light (content) comprises one or more colors determined on one or more average colors of one or more sub-sections of a plurality of subsequent images. Note that with a plurality of ambience light sources 210, also the ambience light of one or more subsets of the plurality of ambience light sources may follow the content of screen (or image) sub sections. The ambience light generated by the ambience light source(s) (that are configured to illuminate the screen 201) provide light that is visible, and that in general is related to the video content on the screen (201), i.e. the image 102 on the screen and optionally the video image(s) of one or more preceding and/or one or more subsequent images on the screen. The ambience lighting (content) may vary from image (frame) to image (frame).

Figure 1B:
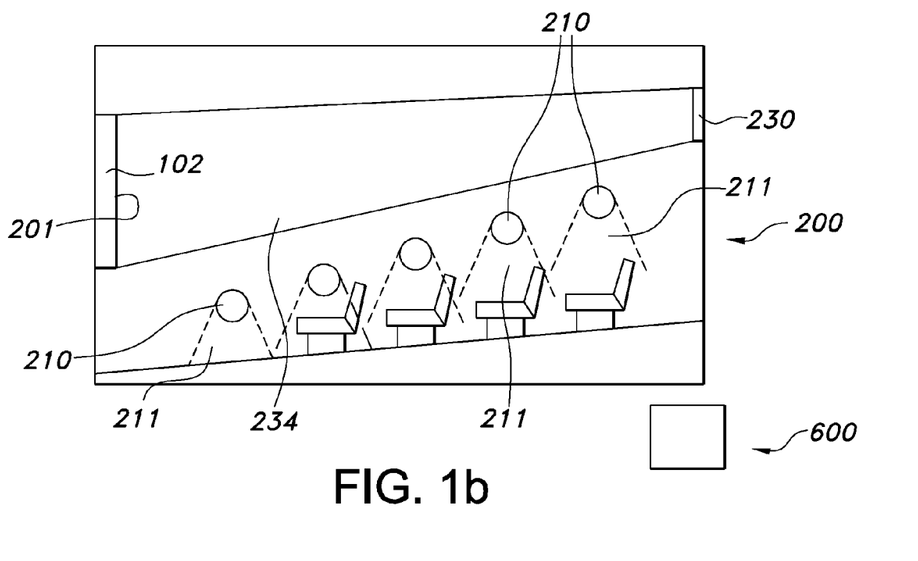

FIG. 1b schematically depicts (in side view or cross-sectional view) an embodiment of a display situation. Reference 200 indicates a display space, such as cinema. Reference 230 indicates a projector, which projects an image 102 on the remote screen 201. The beam containing the image(s) information is indicated with reference 234. The projected image is again indicated with reference 102. Further, like in e.g. WO-2011/073877, ambience light sources 210 are provided. One or more of them may illuminate with ambience light 211 the screen 201 (or image 102). This may happen in a direct way (see FIG. 1a) or in an indirect way. For instance, one or more of the ambience light sources 210 schematically depicted in FIG. 1*b* may illuminate the screen 201 via reflection of the ambience light 211 on e.g. the floor or the wall. In this way, the ambience light reaches the screen in an indirect way. Note that the in FIG. 1*b* schematically embodiment may also include a light source for direct illumination of the screen with ambience light 211. Alternatively, other arrangements are also possible, see also e.g. FIGS. 1*c* and 1*d*.

Reference 600 indicates a cinema server or media server, which may be applied to control the projector 230 and the ambience light source(s) 210. Hence, in this embodiment, the ambience light source 210 in fact comprises a plurality of ambience light sources 210. Note that these ambience light sources 210 may consist of two or more subsets that are individually controlled. For instance, the intensity of the ambience light 211 provided by ambience light sources that illuminate the screen may be lower than of those ambience light sources 210 that do not (directly or indirectly illuminate the screen 201). Those that do not directly or indirectly illuminate the screen 201 are herein also indicated as additional ambience light sources. Note that all ambience light sources may be controlled by the cinema server; optionally, one or more subsets of ambience light sources may be controlled individually.

Herein, the term "media server", which may also be indicated as "cinema server", may be defined as a dedicated computer appliance or to specialized application software, for storing various digital media (meaning digital videos/movies, audio/music, and picture files). The cinema server has a data container with the movie file, and/or it has a satellite connection to receive the movie content. It can often decrypt, decompress and encrypt the movie, before it is sent to the projector. It is often combined with a theatre management system. A cinema server is a server that receives movie data, especially from an external provider; the cinema server may handle content security (like decryption with a key code, watermarking) and may decompress the content, which may then sent to a digital cinema projector using link-encrypted data exchange.

Figure 1C:
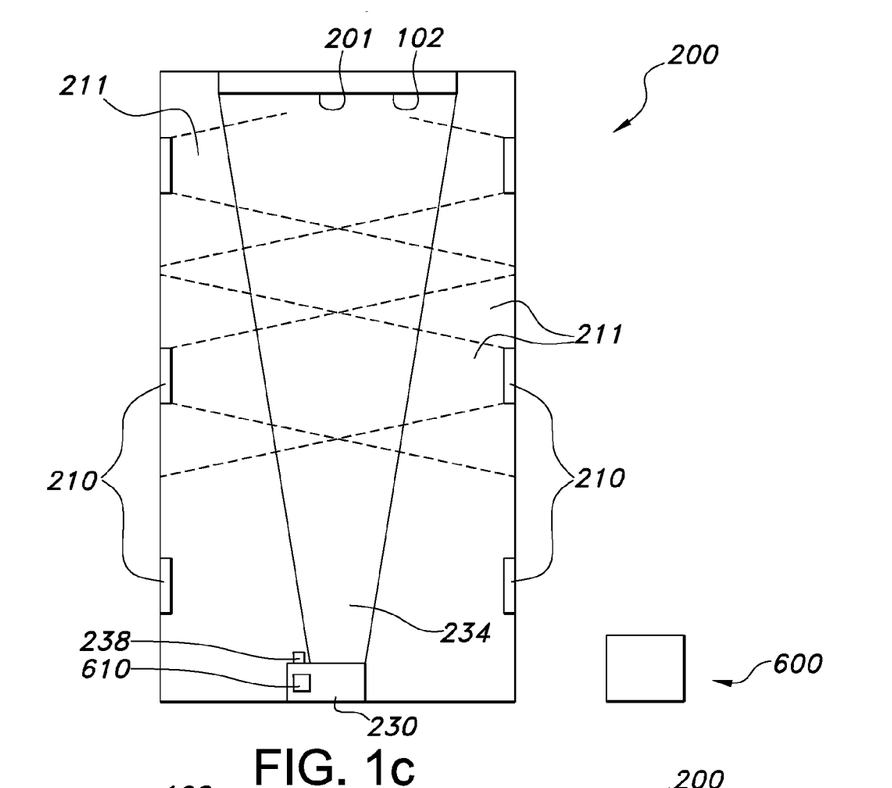

FIG. 1*c* schematically depicts a top view of an alternative embodiment. The display space 200 may optionally comprise one or more additional ambience light sources 210. The additional ambience light source(s) 210 are especially configured to provide ambience light at a display space part of one or more of a wall, a ceiling and a floor. For instance, wall washers may be applied. Note that in this schematically depicted embodiment (at least) part of the ambience light of the ambience light sources may impinge on the remote screen 201 via reflection on the wall(s) and/or floor, etcetera.

FIG. 1*c* further schematically depicts an embodiment of a display device 230 comprising a controller 610 and a sensor 238, wherein the sensor 238 is configured to optically sense the screen and provide a sensor signal, and wherein the controller is configured to derive from the sensor signal information whether or not the screen is illuminated with ambience light. The controller 610 is further configured to interrupt displaying video content on the screen when no ambience light (on the screen) is sensed. The sensor could for example be a camera, and the controller can be a computer program that analyses the video that is recorded with the camera. In another example the camera is a light sensor, and the controller detects the modulation frequency of the ambience light in the signal of the light sensor. In this way, circumventing the security is further improved. In an embodiment, the controller unit 610 might be integrated in the cinema server 600, instead of being integrated in the display device 230. In another embodiment, the controller 610 and cinema server 600 may be in communication with each other.

Figure 1D:
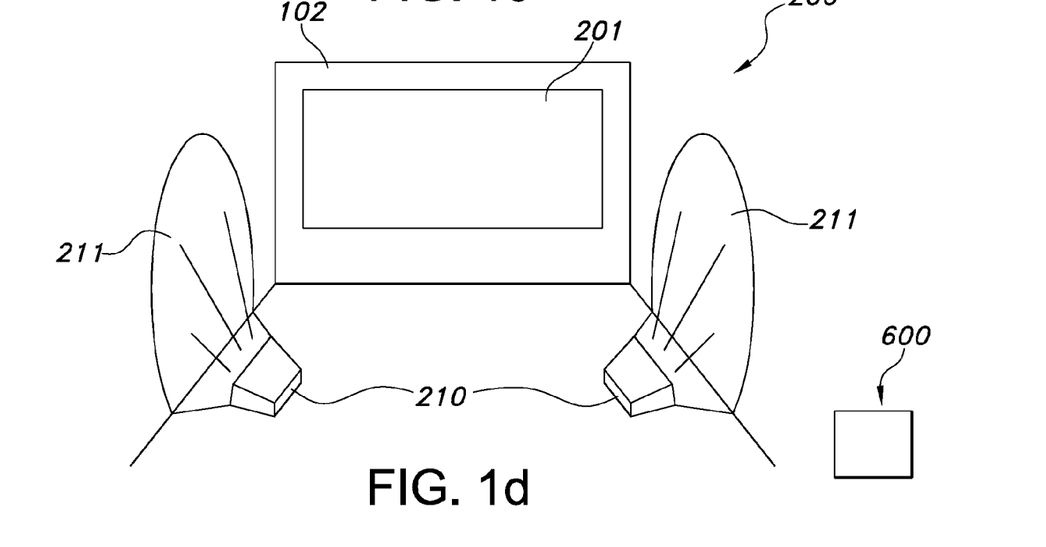

FIG. 1*d* is especially shown to indicate that the ambience light source 210 may not only illuminate the screen directly, but also indirectly. Here, in this schematic drawing the ambience light source 210 illuminates the wall(s). Via reflection, also the screen 201 will be illuminated. In this example, the lights are mounted along the wall, but preferably alternatively or additionally the lights may also be mounted next to the screen, to illuminate the walls directly next to the screen. This gives the most direct relation between the ambience light and the video content, because they are closest to each other.

With respect to the embodiments schematically depicted in FIGS. 1*a* to 1*d*, one or more of the ambience light sources, and especially all ambience light source(s) that is (are) configured to illuminate the screen with ambience light are LED-based ambience light source, that are configured to provide ambience light that is variable in intensity, the ambience light comprises light having a wavelength in the visible part of the spectrum, wherein the LED-based ambience light source further comprises a modulator, configured to modulate the intensity of the ambience light with an intensity modulation having an intensity modulation frequency selected from the range of 40 Hz to 500 Hz. The modulator is not depicted, but modulation of light intensity is known in the art.

Further, with respect to the embodiments schematically depicted in FIGS. 1*a* to *l* d, embodiments of cinema systems are schematically displayed. These comprise a controller, such as the cinema server 600, configured (i) to control a display device 230 configured to display video content 201 on a screen 201, and configured (ii) to control an ambience light source 210 configured to provide ambience light 211 that is variable in intensity, wherein the controller is further configured to control the ambience light 211 as function of the video content and configured to modulate the intensity of the ambience light with an intensity modulation having an intensity modulation frequency selected from the range of 40 Hz to 500 Hz.

In general, the cinema system may thus be a system comprising a plurality of units, e.g. a kit of parts, wherein the controller may be functionally connected to a display device and an (additional) ambience light source.

Figure 2A:
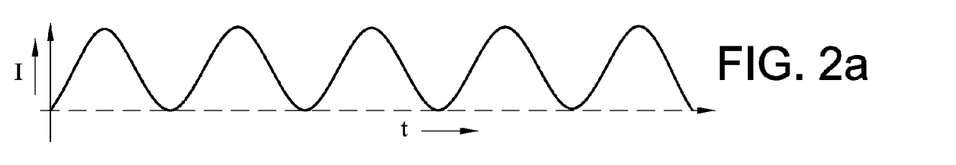
FIGS. 2a to 2h schematically depict some modulation possibilities.
Figure 2B:
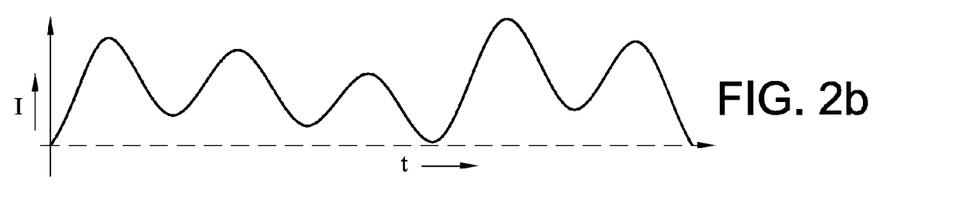
Figure 2C:
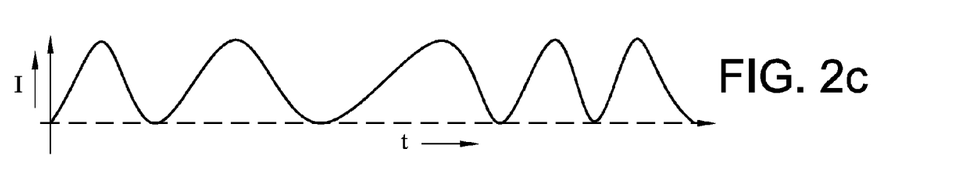
Figure 2D:
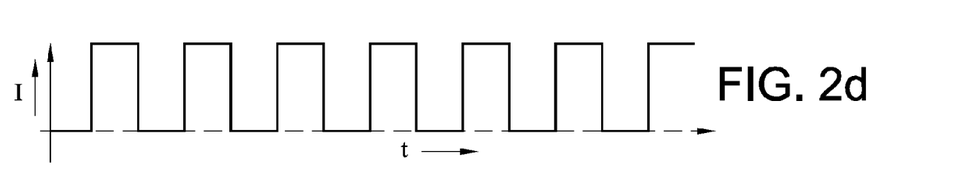
Figure 2E:
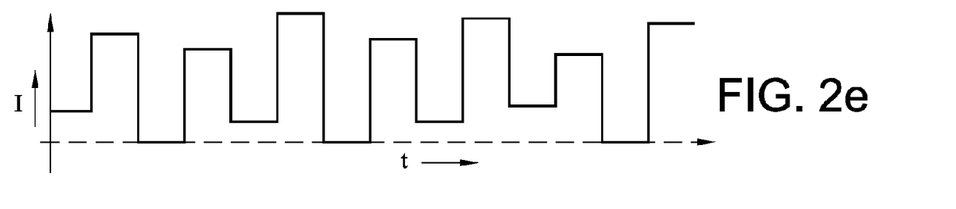
Figure 2F:
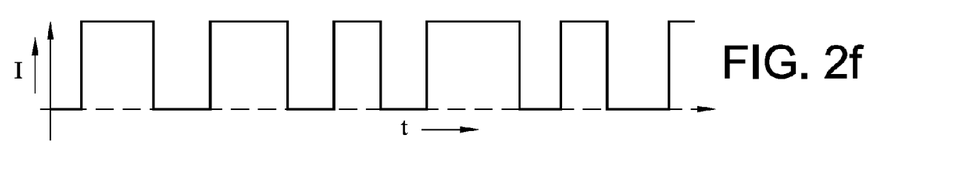
Figure 2G:
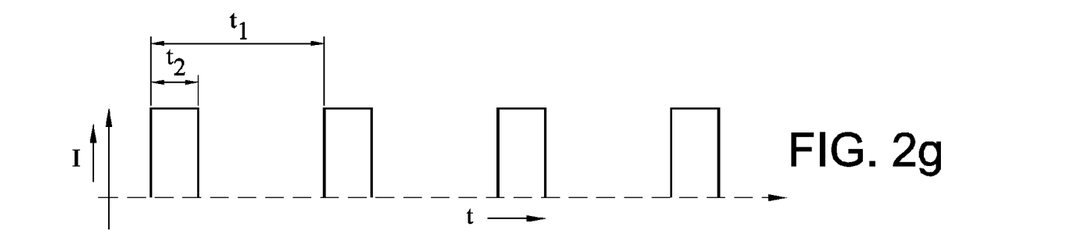
Figure 2H:
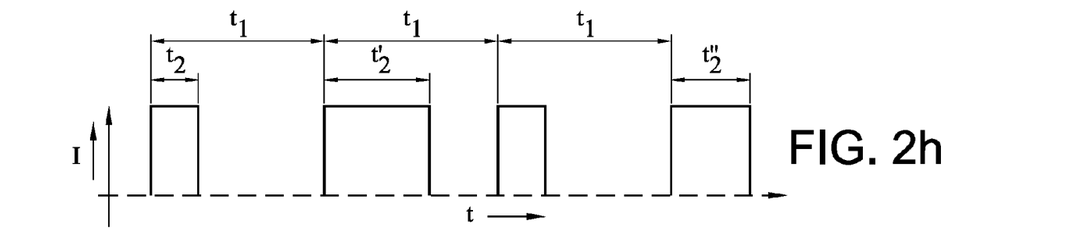

FIGS. 2*a* to 2*h* schematically depict some modulation possibilities. Note that intensity variations due to change of video content in time is not included in these schematic drawings for the sake of understanding the principles. FIG. 2*a* is a "simple" sinusoidal intensity modulation with a constant frequency. FIG. 2*b* is the same, but now the amplitude is varied with time. FIG. 2*c* shows an embodiment wherein the intensity modulation has a frequency variation. This frequency variation may be at random or may follow a scheme that is repeated, or may follow a plurality of different schemes, etc. FIG. 2*d* schematically depicts another type of modulation, a block type of modulation, with in this schematic drawing a constant frequency and no intensity modulation except for the on-off variation. The duty cycle is 50%. In FIG. 2*e*, the intensity is further modulated, and is not a simple on-off. In FIG. 2*f* the frequency is varied. Again, this frequency variation may be at random or may follow a scheme that is repeated, or may follow a plurality of different schemes, etc. FIG. 2*g* schematically depicts an embodiment wherein the duty cycle is smaller than 50%. The reference t1 indicates the entire cycle, and reference t2 indicated the on-state. Herein in this schematically depicted embodiment the duty cycle is about 20%. FIG. 2h schematically depicts an embodiment wherein the duty cycle varies with time. Again, this duty cycle variation may be at random or may follow a scheme that is repeated, or may follow a plurality of different schemes. Varying the frequency and/or the duty cycle may be very effective in impeding making a useful copy, as it will be very difficult to filter those black bands out.

Figure 3:
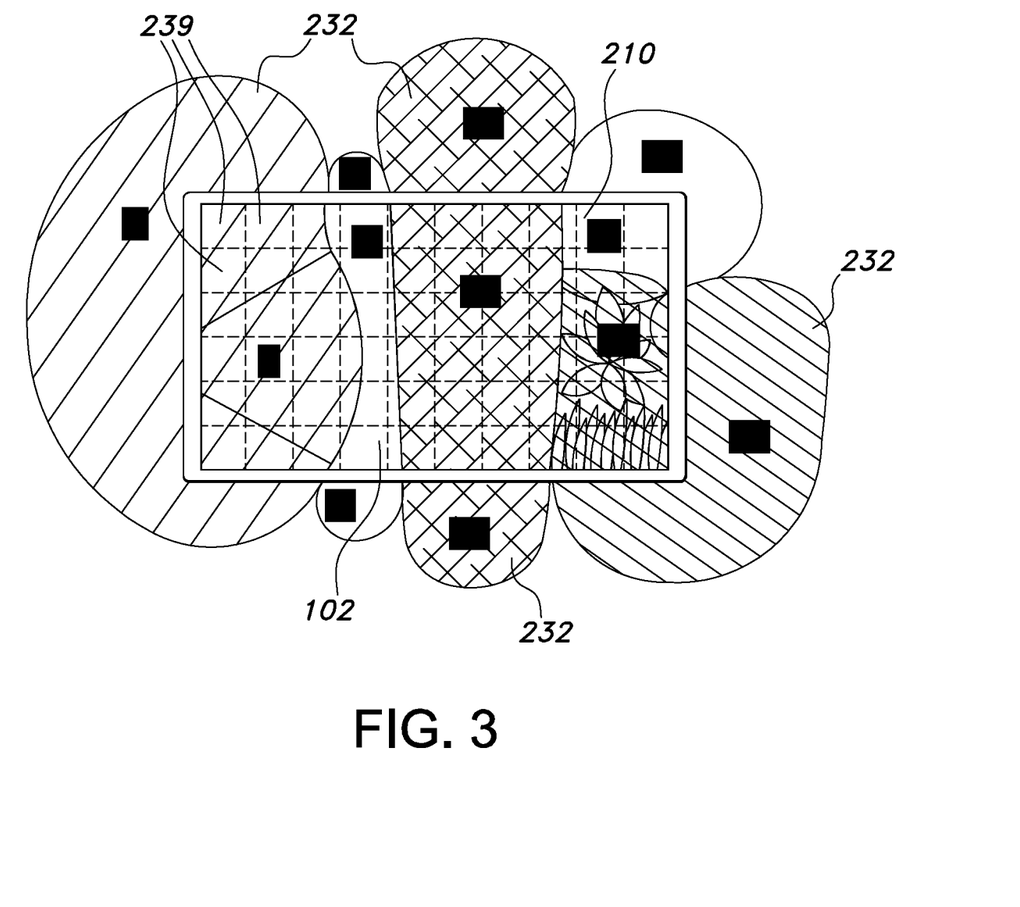
FIG. 3 schematically depicts some aspects of Ambilight or ambience light.

FIG. 3 schematically depicts some aspects of ambience light. The rectangle indicates an image 102 and reference 232, outside the rectangle, indicates ambience light. The colored regions (indicated by shading) within the image (indicated with roman numbers) and the colored regions outside the image (indicated with roman numerals and an accent mark), i.e. the ambience light, correspond, which is indicated by the areas external from the image having the same type of shading. Of course, the ambience light does not (substantially) depict images, but is a low resolution distribution of colors or even a single color (as is known from TV Ambilight). This is shown by example with the flower in the image, which is a high resolution display of information, whereas external from the image, the ambience light is a single color or a low resolution distribution of colors (in this example only one color for area 232). The ambience light comprises one or more colors determined on one or more average colors of one or more sub-sections, which are indicated by reference 239 of an image. Alternatively, the ambience light comprises one or more colors determined on one or more average colors of one or more sub-sections of a plurality of subsequent images. In this schematic drawing, the image 102 is, by way of example, divided in 10*6 subsections. Subsections adjacent to the edge of the image may especially be of importance to evaluate the color of the ambience light external from the image 102 screen 201. For example, the color in area 232 is an average color and intensity of the bottom-right 30% of the screen, averaged over the last 10 frames.

The invention claimed is:

1. A method for preventing pirates from copying video content displayed on a screen in a display space by impeding an optical recording device from making a non-disturbed copy of the displayed video content, the method comprising the steps of:

displaying the video content on the screen, wherein the video content comprises a plurality of images to be displayed sequentially, and illuminating indirectly the screen with ambience light of an ambience light source, wherein the ambience light source is configured to illuminate a non-screen part of the display space, wherein the ambience light comprises light having a wavelength greater than 380 nm and less than 750 nm, wherein the ambience light is controlled as function of the video content, the ambience light comprising one or more colors determined on one or more average colors of one or more sub-sections of an image or wherein the ambience light comprises one or more colors determined on one or more average colors of one or more sub-sections of a plurality of subsequent images, and wherein the ambience light is intensity-modulated with an intensity modulation frequency selected from the range of 40 Hz to 500 Hz.

2. The method according to claim 1, wherein the video content is displayed on the screen with a frame rate, and wherein the frame rate and the intensity modulation frequency have a frequency difference in the range of 0.5 Hz to 50 Hz.

3. The method according to claim 1, wherein the ambience light is intensity-modulated with an intensity modulation frequency of at least 50 Hz, and wherein the intensity modulation frequency is selected from the group consisting of 24x Hz, 25x Hz, 30x Hz, 48x Hz, 50x Hz, 60x Hz, 72x Hz, 120x Hz, and 300x Hz, wherein x is a non-integer number larger than zero.

4. The method according to claim 1, wherein the ambience light source comprises a LED based light source.

5. The method according to claim 1, wherein the ambience light source is configured relative to a screen to allow only part of the ambience light to impinge on the screen.

6. The method according to claim 1, wherein the intensity of the ambience light is controlled as function of the video content.

7. The method according to claim 1, wherein the intensity modulation frequency is varied in time.

8. The method according to claim 1, further comprising providing with the ambience light a watermark on the screen.

* * * * *